(12) United States Patent
Yadomaru

(10) Patent No.: US 12,589,681 B2
(45) Date of Patent: Mar. 31, 2026

(54) SEAT

(71) Applicant: SUBARU CORPORATION, Tokyo (JP)

(72) Inventor: Yusuke Yadomaru, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 225 days.

(21) Appl. No.: 18/598,688

(22) Filed: Mar. 7, 2024

(65) Prior Publication Data

US 2024/0308399 A1     Sep. 19, 2024

(30) Foreign Application Priority Data

Mar. 15, 2023     (JP) ................................. 2023-040644

(51) Int. Cl.
B60N 2/427          (2006.01)
(52) U.S. Cl.
CPC ............................... B60N 2/42781 (2013.01)
(58) Field of Classification Search
CPC .... B60N 2/42745; B60N 2/433; B60N 2/288;
B60R 2021/0048
See application file for complete search history.

(56) References Cited

U.S. PATENT DOCUMENTS

| | | | | | |
|---|---|---|---|---|---|
| 5,378,043 A | * | 1/1995 | Viano | ..................... | B60N 2/888 |
| | | | | | 297/216.12 |
| 6,199,947 B1 | * | 3/2001 | Wiklund | ................ | B60N 2/865 |
| | | | | | 297/216.12 |

| | | | | | |
|---|---|---|---|---|---|
| 6,523,892 B1 | * | 2/2003 | Kage | ..................... | B60N 2/888 |
| | | | | | 297/216.13 |
| 6,631,955 B2 | * | 10/2003 | Humer | .................. | B60N 2/838 |
| | | | | | 297/216.12 |
| 9,248,767 B2 | * | 2/2016 | Ishimoto | ................ | B60N 2/838 |
| 11,505,102 B2 | * | 11/2022 | Fujioka | .................. | B60N 2/865 |
| 11,772,531 B1 | * | 10/2023 | Swierczewski | ...... | B60N 2/4279 |
| | | | | | 297/216.1 |
| 2002/0043832 A1 | * | 4/2002 | Watanabe | ................ | B60N 2/66 |
| | | | | | 297/216.13 |

FOREIGN PATENT DOCUMENTS

| | | |
|---|---|---|
| JP | UM-S56-18752 A | 2/1981 |
| JP | H11-34707 A | 2/1999 |
| JP | 2013-203349 A | 10/2013 |

* cited by examiner

*Primary Examiner* — Joshua J Michener
*Assistant Examiner* — Ryan Andrew Yankey
(74) *Attorney, Agent, or Firm* — McGinn IP Law Group, PLLC

(57)          ABSTRACT

A seat on which an occupant of a vehicle is seated includes: a backrest that faces a back part of the occupant; a headrest provided in an upper part of the backrest; a backrest frame including side members that extend in an upward-downward direction along left and right side end parts of the backrest; a cross member provided to bridge the left and right side members and attached to the side members to be movable upward and downward; a headrest post that protrudes downward from the headrest and is coupled to the cross member; and a cross member detachment mechanism performs detachment of the cross member from the side members, in accordance with a load toward a rear side of the vehicle input to the cross member. The load triggering the detachment by the cross member detachment mechanism decreases as the cross member rises with respect to the side members.

4 Claims, 8 Drawing Sheets

VEHICLE FORWARD SIDE

FIG. 2

VEHICLE WIDTH DIRECTION

FIG. 3

VEHICLE FORWARD SIDE

42

44

51

43

50

VEHICLE WIDTH DIRECTION

*FIG. 4*

VEHICLE FORWARD SIDE

VEHICLE FORWARD SIDE

SEAT

CROSS-REFERENCE TO RELATED APPLICATIONS

The present application claims priority from Japanese Patent Application No. 2023-040644 filed on Mar. 15, 2023, the entire contents of which are hereby incorporated by reference.

BACKGROUND

The disclosure relates to a seat on which an occupant of a vehicle is seated.

Japanese Unexamined Patent Application Publication (JP-A) No. H11-34707 discloses an example of a technique related to a seat of a vehicle such as an automobile. A headrest of this vehicle seat is raised in response to a collision onto the vehicle, to effectively protect the head of the occupant for reducing whiplash.

First link arms are pivotally attached to the inner wall surfaces of both side parts of a seat back frame, and second link arms are pivotally supported, at coupling parts, on pivotal end sides of the first link arms. A load receiving member is laterally provided between the second link arms. A holder bracket that supports the headrest is fixedly attached to a coupling bar bridging the upper end sides of the second link arms.

Japanese Unexamined Patent Application Publication (JP-A) No. 2013-203349 discloses a whiplash reduction bar disposed on the rear side of the headrest, as a movable supporter forming a vehicle occupant restraining device. The whiplash reduction bar includes: a coupling part extending along a seat width direction; a pair of left and right guided parts extending downward from both end portions of a coupling part in the seat width direction. The left and right guided parts are supported by left and right side parts of a seat back frame via left and right sliders and left and right guide pipes.

Japanese Unexamined Utility Model (Registration) Application Publication (JP-UM-A) No. S56-18752 discloses a vehicle seat including a seat back including a headrest part, a backrest part, and a hip rest part. Each of sections between the headrest part and the backrest part and between the backrest part and the hip rest part is expandable.

SUMMARY

An aspect of the disclosure provides a seat on which an occupant of a vehicle is seated. The seat includes a backrest, a headrest, a backrest frame, a cross member, a headrest post, and a cross member detachment mechanism. The backrest faces a back part of the occupant. The headrest is provided in an upper part of the backrest. The backrest frame includes side members that extend in an upward-downward direction along a left side end part and a right side end part of the backrest respectively. The cross member is provided to bridge the side members and attached to the side members to be movable upward and downward. The headrest post protrudes downward from the headrest and is coupled to the cross member. The cross member detachment mechanism is configured to perform detachment of the cross member from the side members, in accordance with a load toward a rear side of the vehicle that is input to the cross member. The load triggering the detachment by the cross member detachment mechanism decreases as the cross member rises with respect to the side members.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 2 is a schematic transparent view as viewed in a direction indicated by arrows II-II in FIG. 1.

FIG. 3 is a schematic cross-sectional view as viewed in a direction indicated by arrows III-III in FIG. 2.

FIG. 4 is a perspective view schematically illustrating a state where a side member is inserted in an inner tube.

DETAILED DESCRIPTION

To reduce whiplash injury as a result of rear collision in a vehicle such as an automobile, it is a common practice to employ a method of reducing backward bending of the neck by supporting the back of the head from the diagonally upward side using a headrest structure.

However, when the body size of the occupant is very small, the most protruding part of the back of the head may be disposed in the vicinity of the lower end part of the headrest.

In this state, the upper body sinks into the backrest structure and the back of the head is pushed out by the headrest, resulting in forward bending of the neck, which is a behavior that is opposite to the normal behavior at the time of rear collision, and thus may lead to injury.

To address this, the movable range (adjustable range) of the headrest may be expanded downward, but this leads to a difficulty in guaranteeing space and strength, as well as comfortability when an occupant with a relatively large body size is seated.

It is desirable to provide a seat that reduces injury of an occupant due to rear collision.

An embodiment of a seat to which the disclosure is applied will be described below with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The seat of the embodiment on which an occupant is seated is disposed in the vehicle cabin of a vehicle such as an automobile for example.

Figure 1:
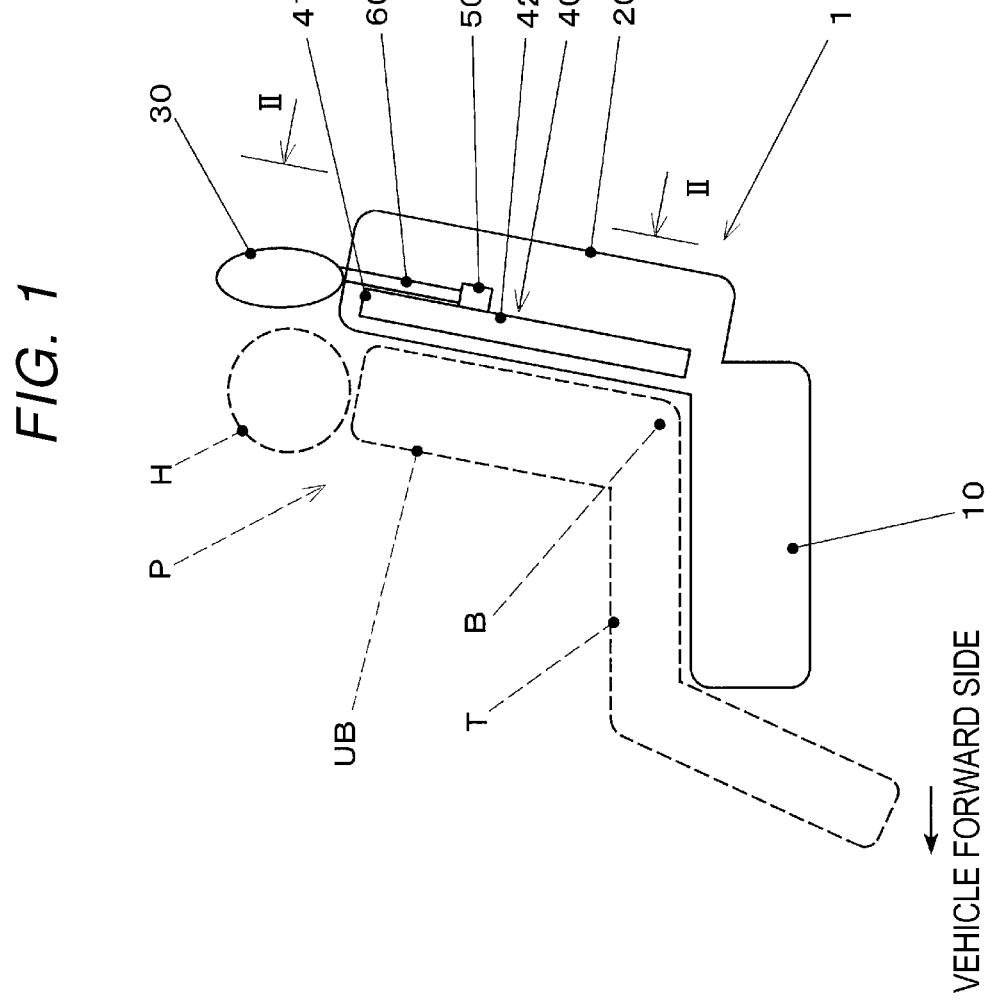
FIG. 1 is a schematic side view illustrating a state where an occupant is seated on a seat to which an embodiment of the disclosure is applied.

FIG. 1 is a schematic side view illustrating a state where an occupant is seated on the seat of the embodiment.

A seat 1 includes a seat cushion 10, a backrest 20, a headrest 30, a backrest frame 40, a cross member 50, headrest posts 60, an upper telescopic cover 70, a lower telescopic cover 80, an elevator device 90, and the like.

The seat cushion 10 is a seat surface part to support the thighs T and the buttocks B of an occupant P.

The seat cushion 10 includes an upper surface part disposed substantially along the horizontal direction.

The backrest 20 is disposed to face the back part of an upper body UB of the occupant P.

The backrest 20 extends upward from the vicinity of the rear end part of the seat cushion 10.

The backrest 20 incorporates the backrest frame 40, the cross member 50, and the lower parts of the headrest posts 60 as described below.

The headrest 30 is disposed behind the head H of the occupant P.

The headrest 30 is coupled to the cross member 50 via the headrest posts 60 as described below.

The headrest 30 moves upward and downward with respect to the backrest 20, together with the cross member 50 moving upward and downward with respect to the backrest frame 40.

The backrest frame 40 is a frame-shaped structure member disposed inside the backrest 20.

The backrest 20 is formed by an elastic and flexible cushioning material, such as a foamed urethane resin for example, wrapped around the backrest frame 40 and the cross member 50 serving as the core.

Figure 2:
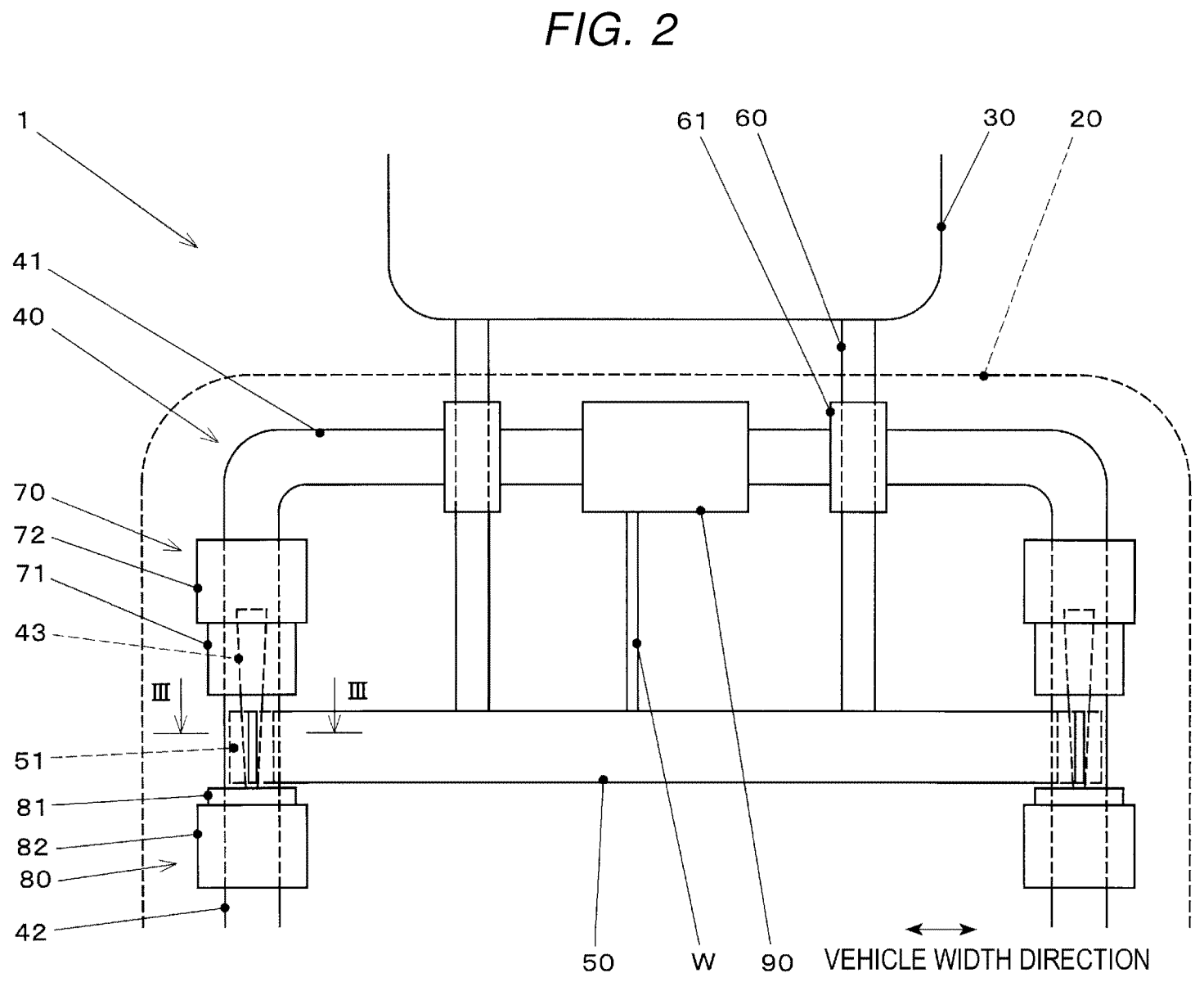

FIG. 2 is a schematic transparent view as viewed in a direction indicated by arrows II-II in FIG. 1.

The backrest frame 40 includes an upper member 41, side members 42, and the like.

The upper member 41 is disposed in the vicinity of the upper end part of the backrest 20.

The upper member 41 is a beam-shaped part extending in the left-right direction.

The side members 42 are disposed in the vicinity of side end parts of the backrest 20.

The side members 42 are column-shaped parts extending in the upward-downward direction.

The side members 42 have upper end parts respectively coupled to the left and right side end parts of the upper member 41.

The upper member 41 and the side members 42 are permanently affixed by bending a common round pipe material for example.

The side members 42 each have a rear surface part provided with a groove 43 that is a slit-shaped opening.

An engagement part 51 provided to a side end of the cross member 50 is attached to the groove 43.

The groove 43 is formed through a circumference surface of the side member 42.

The groove 43 is formed as a long hole extending in the longitudinal direction of the side member 42.

The groove 43 has a width, in the left-right direction, continuously varying in the upward-downward direction to be wider on the upper side than on the lower side.

The cross member 50 is a beam-shaped member extending in the left-right direction to bridge the left and right side members 42.

The cross member 50 is displaceable in the upward-downward direction with respect to the backrest frame 40.

The cross member 50 has both left and right end portions provided with the respective engagement parts 51.

The engagement part 51 has a protruding end part inserted into the groove 43 of the side member 42 to be attached to the side member 42.

The groove 43 serves as a guide rail that guides the engagement part 51 in the upward-downward direction.

Figure 3:
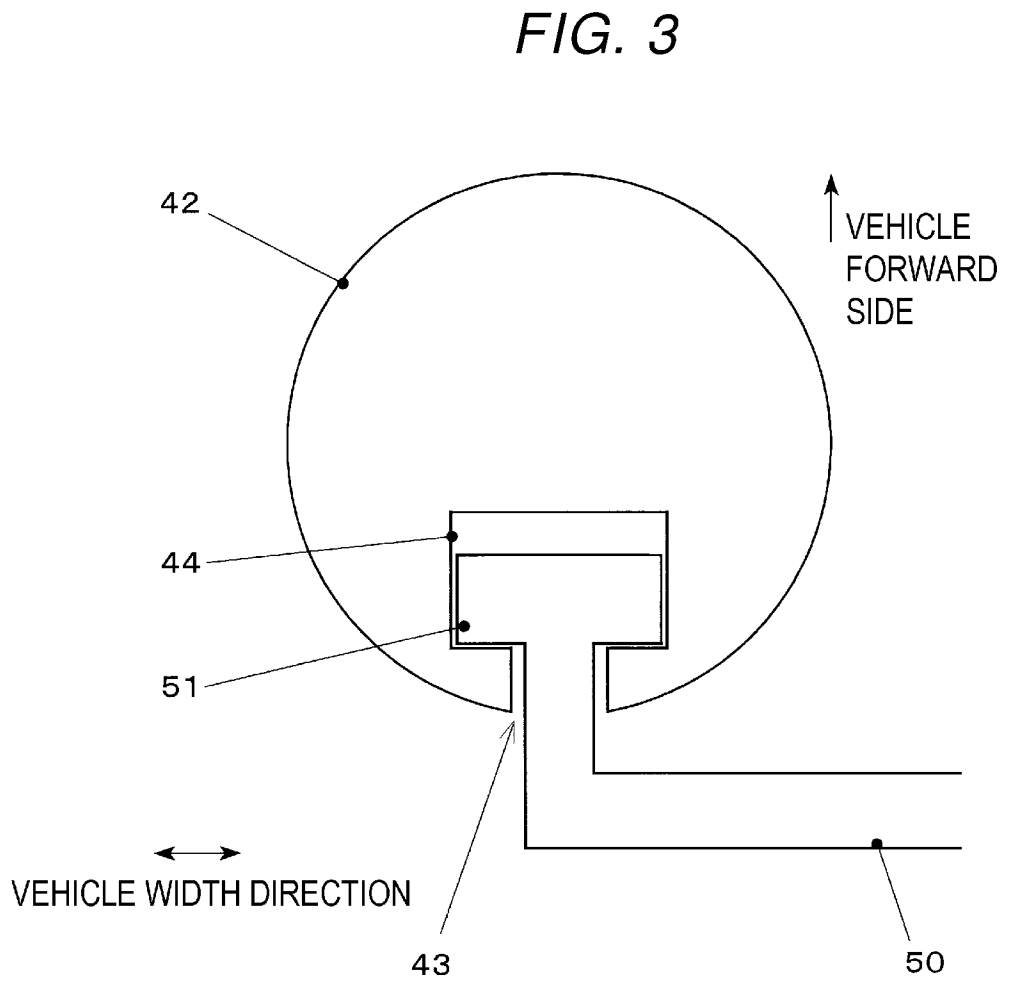

FIG. 3 is a schematic cross-sectional view as viewed in a direction indicated by arrows III-III in FIG. 2.

The engagement part 51 of the cross member 50 protrudes forward from the end part of the cross member 50, and has the front end part expanding in the left-right direction (T-shaped cross section).

The side member 42 includes a space 44 for accommodating the engagement part 51, on the inner side of the groove 43.

For example, the space 44 has a rectangular cross-section to be capable of accommodating the engagement part 51.

The space 44 can be formed by fixedly attaching a C channel material on the inner side of the round pipe material forming the side member 42, by welding or the like for example.

The groove 43 and the space 44 serve as a T-slot-shaped groove with the groove bottom side (vehicle forward side) widened with respect to the front surface side of the side member 42.

The width of the groove 43 is set to be larger than the largest width of the engagement part 51 in the vicinity of the upper end part.

Thus, the cross member 50 can be assembled to the backrest frame 40, by inserting the engagement part 51 into the space 44 from the groove 43.

In a region of the groove 43 other than the vicinity of the upper end part, the width of the groove 43 is set to be smaller than the largest width of the engagement part 51.

With this configuration, the cross member 50 is prevented from detaching from the backrest frame 40 during the normal use of the vehicle or the like.

For example, in a region of the groove 43 in the vicinity of the lower end part, the width of the groove 43 is set to be smaller than the other region, to prevent the engagement part 51 from detaching from the groove 43 due to a load received from the upper body UB of the occupant P at the time of rear collision.

When the cross member 50 receives an input toward the vehicle rear side due to the rear collision of the vehicle or the like for example while the engagement part 51 is engaged with the region of the groove 43 other than the region in the vicinity of the lower end part, the edge part of the groove 43 is deformed to be widened and the engagement part 51 is detached from the groove 43.

The groove 43 and the engagement part 51 serve as a cross member detachment mechanism of the disclosure.

With the width of the groove 43 varying in the upward-downward direction, the load for detaching the engagement part 51 decreases as the cross member 50 moves upward.

Thus, the detachment is hindered when the cross member 50 is disposed on the lower side, whereas the detachment is facilitated when the cross member 50 is disposed on the upper side.

The headrest posts 60 are columnar members protruding downward from the headrest 30.

A pair of headrest posts 60 are disposed while being separated from each other in the left-right direction.

The headrest posts 60 each have a lower end part coupled and fixed to an intermediate part of the cross member 50.

The intermediate part of the headrest post 60 is attached to an intermediate part of the upper member 41 of the backrest frame 40 via a guide member 61.

The guide member 61 is formed in a tubular shape into which the headrest post 60 is inserted for example.

The guide member 61 restrains the movement of the headrest post 60 in the forward-rearward direction and the left-right direction, while allowing the movement of the headrest post 60 in the upward-downward direction.

When the cross member 50 is detached, the guide member 61 allows the pivotal (swinging) movement of the headrest post 60 about the longitudinal direction of the upper member 41.

The upper telescopic cover 70 and the lower telescopic cover 80 are devices that cover the region of the groove 43 other than the region engaged with the engagement part 51.

The upper telescopic cover 70 and the lower telescopic cover 80 are respectively provided above and below the engagement part 51.

The upper telescopic cover 70 includes an inner tube 71, an outer tube 72, and the like.

The inner tube 71 is a cylindrical member into which the side member 42 is inserted to be on the inner diameter side.

The inner circumference surface of the inner tube 71 faces the outer circumference surface of the side member 42 in a slidable state.

Figure 4:
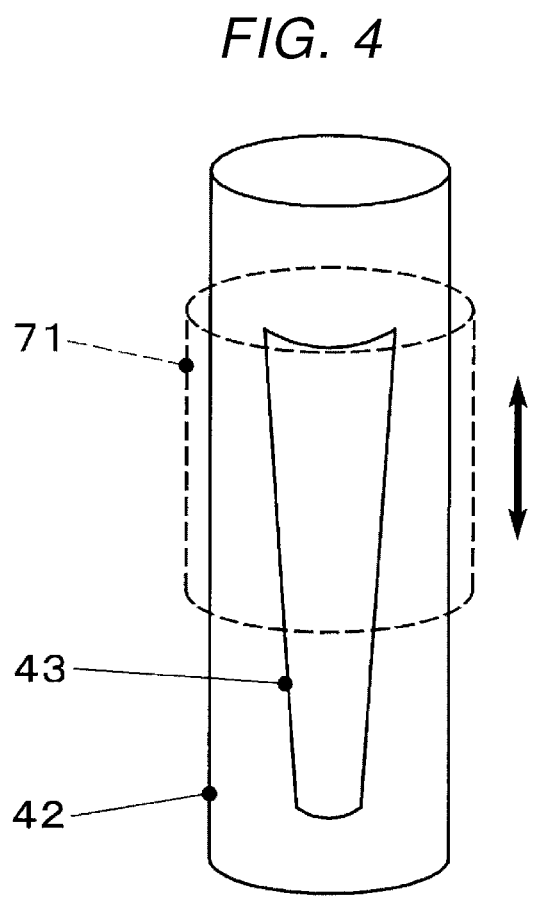

FIG. 4 is a perspective view schematically illustrating a state where the side member is inserted in the inner tube.

In the region disposed in an overlapping manner with the groove 43, the inner tube 71 serves as a deformation reduction member that reduces the deformation of the edge part and the like of the groove 43 and restrains the detachment of the engagement part 51 when a load toward the vehicle rear side is input to the engagement part 51.

The inner tube 71 moves upward and downward with respect to the side member 42 together with the upward and downward movement of the engagement part 51 with respect to the side member 42.

The inner tube 71 has a lower end part coupled to the engagement part 51 by a coupling part not illustrated.

The outer tube 72 is a cylindrical member into which the inner tube 71 is inserted to be on the inner diameter side.

The outer tube 72 is fixed to the side member 42, and movably supports and guides the upper part of the inner tube 71 in the upward-downward direction with respect to the side member 42.

The lower telescopic cover 80 includes an inner tube 81 and an outer tube 82 that respectively have the configurations of the inner tube 71 and the outer tube 72 of the upper telescopic cover 70 flipped upside down.

The elevator device 90 drives the headrest 30, the cross member 50, and the headrest posts 60 in the upward-downward direction with respect to the backrest frame 40, by using an actuator such as an electric motor for example.

For example, the elevator device 90 may be configured to drive the headrest 30 and the like upward and the downward by winding and unwinding a wire W coupling a reel driven by the electric motor and the cross member 50 to each other for example.

The effects of the seat of the embodiment will be described through comparison with a comparative example of the disclosure.

6

Figure 5:
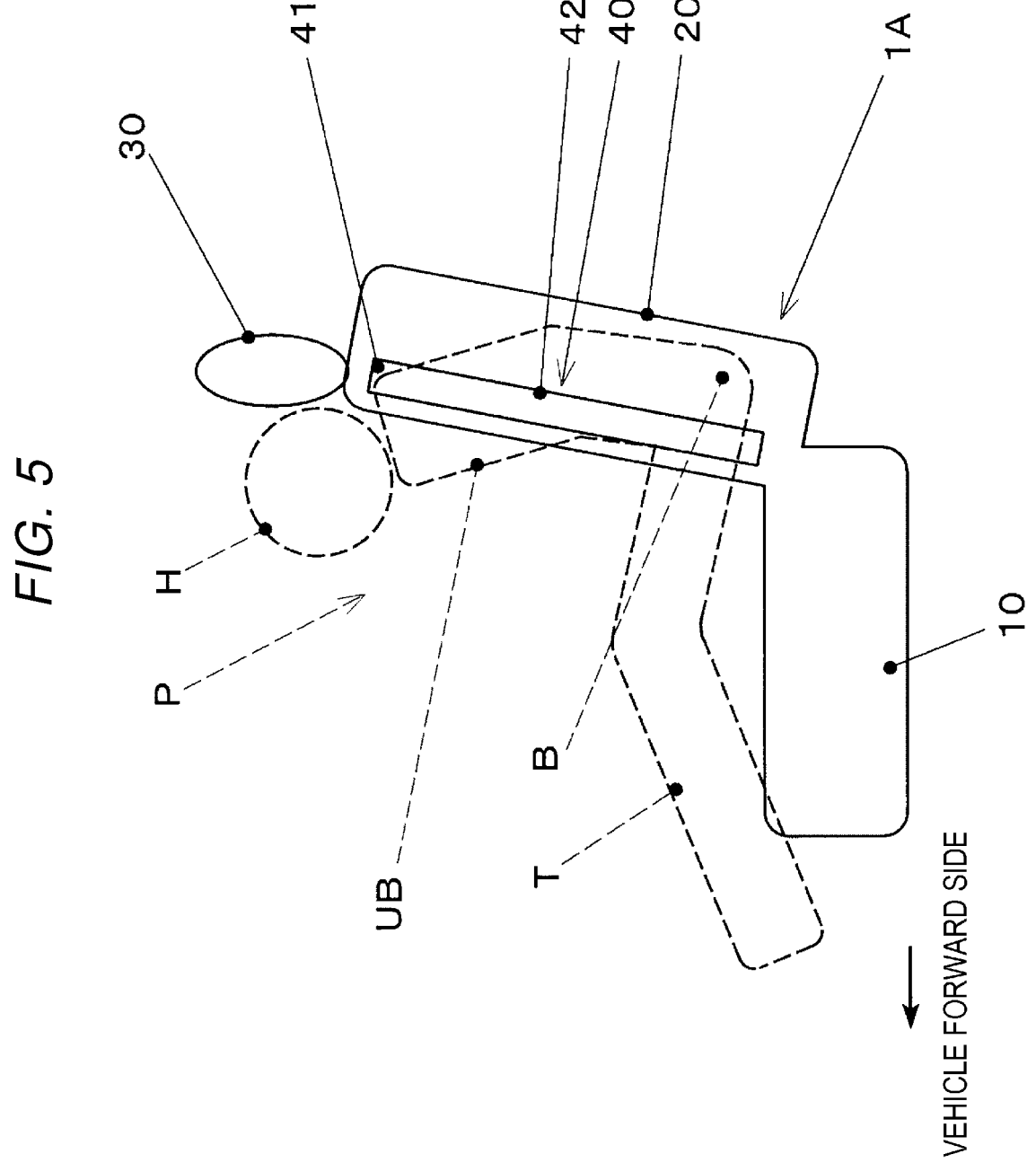
FIG. 5 is a schematic side view illustrating a state where rear collision has occurred while a small occupant is seated on a seat of a comparative example of the disclosure.

FIG. 5 is a schematic side view illustrating a state where rear collision has occurred while a small occupant is seated on a seat of the comparative example.

In this specification and the like, the small body size refers to a body size with a sitting height so low that even the headrest 30 lowered to the lower limit of the adjustable range is not settable to an appropriate positional relationship with the head H (because the most protruding part of the back of the head is at or lower than the lower end part of the headrest 30).

In the comparative example, the parts that are the same as those in the embodiment described above are denoted by the same reference signs and will not be described. The description will be mainly given on differences.

A seat 1A of the comparative example is obtained by removing the cross member 50 and the related configuration from the seat 1 of the embodiment.

As illustrated in FIG. 5, the upper body UB of the occupant P with a small body size sinks deep into the backrest 20 (section between the left and right side members 42).

As a result, the head of the occupant P is pushed forward by the headrest 30 and the upper member 41, and the neck is bent forward.

Figure 6:
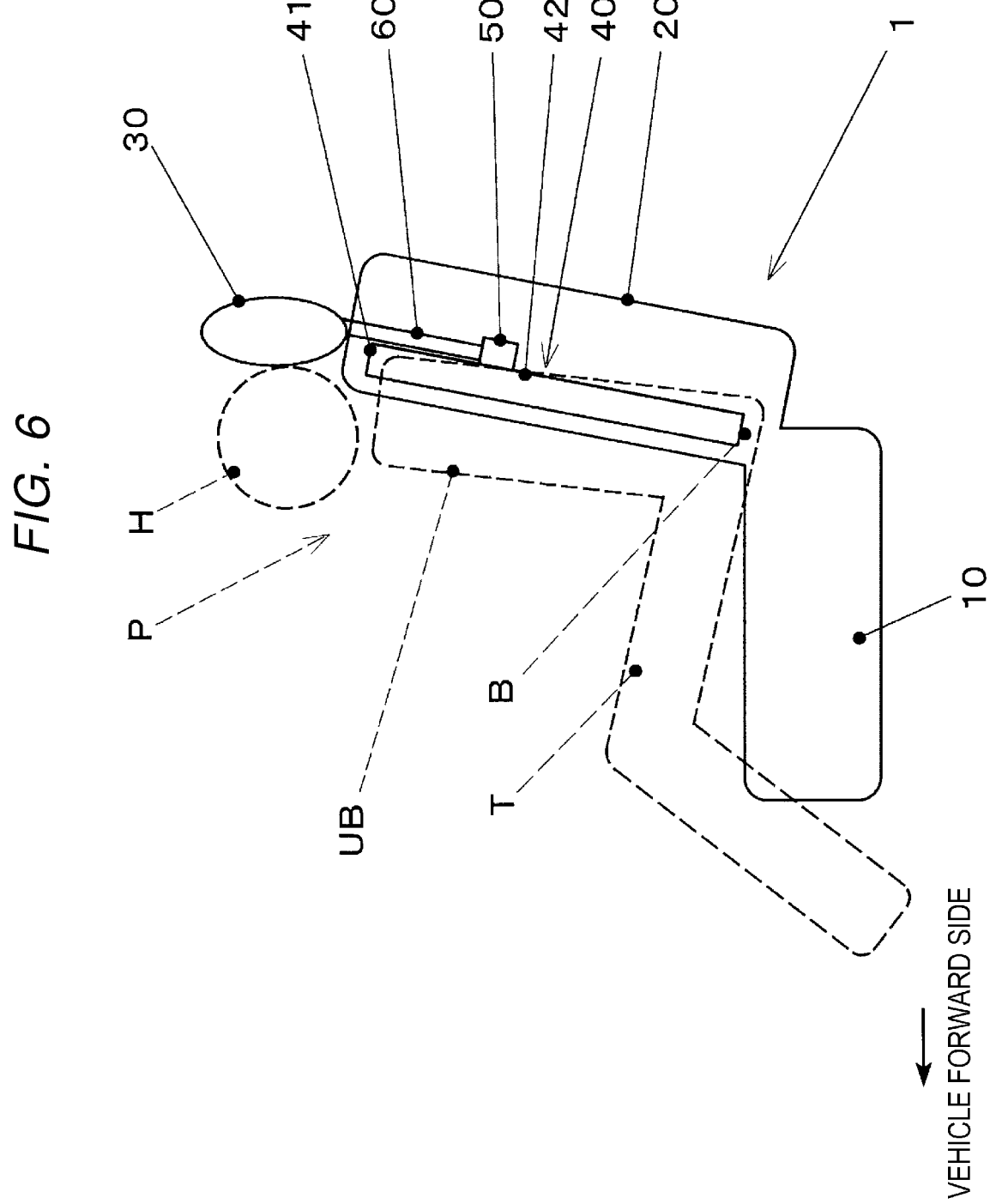
FIG. 6 is a schematic side view illustrating a state where rear collision has occurred while a small occupant is seated on the seat of the embodiment.

FIG. 6 is a schematic side view illustrating a state where rear collision has occurred while a small occupant is seated on the seat of the embodiment.

In the embodiment, the cross member 50 supports the shoulders and the back part of the upper body UB of the occupant P, whereby sinking of the upper body UB into the backrest 20 is reduced.

As a result, the forward bending of the neck is reduced.

Figure 7:
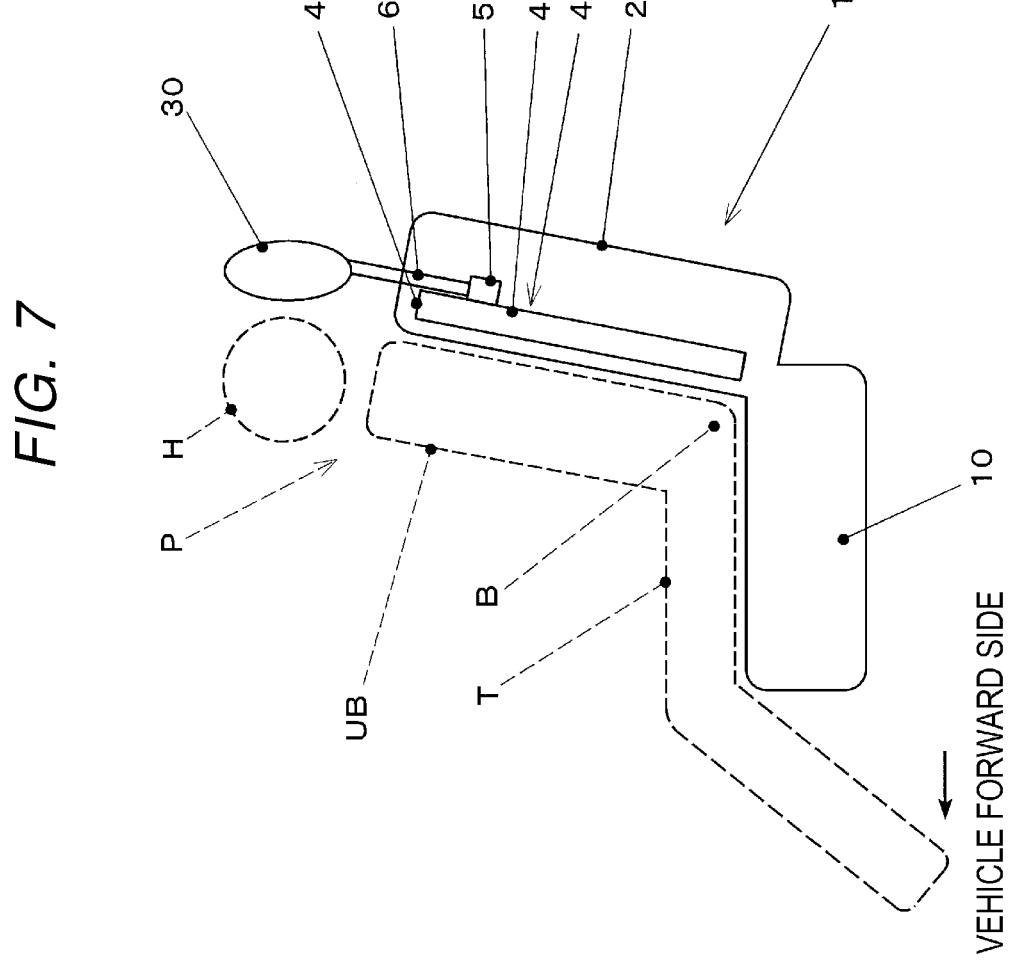
FIG. 7 is a schematic side view illustrating a state where a large occupant is seated on the seat of the embodiment.

FIG. 7 is a schematic side view illustrating a state where a large occupant is seated on the seat of the embodiment.

Figure 8:
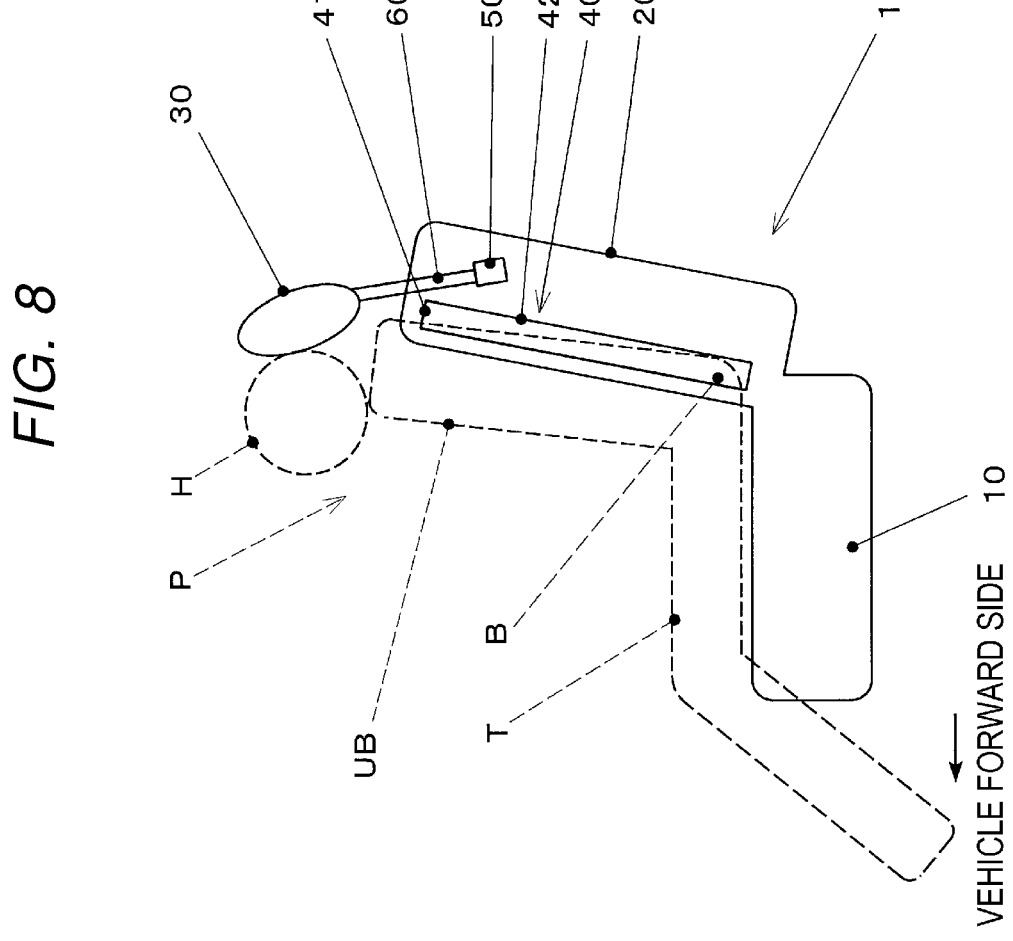
FIG. 8 is a schematic side view illustrating a state where rear collision has occurred while a large occupant is seated on the seat of the embodiment.

FIG. 8 is a schematic side view illustrating a state where rear collision has occurred while a large occupant is seated on the seat of the embodiment.

The occupant P with a large body size is seated with the headrest 30 raised, meaning that the cross member 50 is raised relative to the backrest frame 40.

When rear collision onto the vehicle occurs in this state, the cross member 50 is detached toward the rear side by a backward load input to the cross member 50 from the upper body UB of the occupant P.

Thus, the upper body UB of the occupant P can appropriately sink into the backrest 20, and with the lower end part of the headrest post 60 moved rearward, the headrest 30 is inclined forward to support the head H, whereby the whiplash injury due to the neck bent backward can be prevented.

With the embodiment described above, the following effects can be obtained.

(1) For the occupant P with a small body size, the cross member 50 receives a rearward load input from the back part of the upper body UB of the occupant P when the rear collision occurs, so that the upper body UB of the occupant P can be prevented from excessively sinking into the backrest 20.

Thus, the forward bending of the neck due to the back of the head of the occupant P pushed by the headrest 30 can be reduced.

On the other hand, for the occupant P with a large body size, the cross member 50 is raised together with the headrest 30. Thus, a load for detaching the engagement part 51 from the groove 43 of the side member 42 is reduced, whereby the detachment of the cross member 50 is facilitated.

When the rear collision occurs, the cross member 50 is detached. Thus, the upper body UB of the occupant P appropriately sinks into the backrest 20 and the headrest 30 supports the head H, whereby the whiplash injury due to backward bending of the neck can be reduced.

(2) The cross member detachment mechanism includes: the grooves 43 that are formed in the side members 42, extend in the upward-downward direction, and have a groove bottom side wider than a surface side of the side members 42; and the engagement parts 51 that are provided in the cross member 50 and engage with the grooves 43. On the surface side of the side members 42, the width of the grooves 43 is larger on the upward side than the downward side of the side members 42. With this simple configuration, the above-described effects can be obtained.

(3) The inner tubes 71 and 81 are provided that are formed in a tubular shape into which the side members 42 are inserted, move upward and downward with respect to the side members 42 together with the cross member 50, and reduce the deformation of the side members 42 in a direction of widening the groove 43. Thus, the deformation of the side members 42 in the direction of widening the grooves 43 is reduced in the portions where the inner tubes 71 and 81 are provided, whereby the load triggering the detachment of the cross member 50 can be appropriately set.

MODIFIED EXAMPLES

The disclosure is not limited to the embodiment described above, and can be varied or modified in various ways. Such variations and modifications are included in the technical scope of the disclosure.

The shape, structure, material, manufacturing method, quantity, arrangement, and the like of each member of the seat are not limited to those in the embodiment described above, and can be changed as appropriate.

For example, the specific configuration of the cross member detachment mechanism is not limited to the embodiment described above, and can be changed as appropriate.

A seat according to an aspect of the disclosure is a seat on which an occupant of a vehicle is seated, the seat comprising: a backrest that faces a back part of the occupant; a headrest provided in an upper part of the backrest; a backrest frame comprising side members that extend in an upward-downward direction along left and right side end parts of the backrest; a cross member that is provided to bridge the left and right side members and attached to the side members to be movable upward and downward; a headrest post that protrudes downward from the headrest and is coupled to the cross member; and a cross member detachment mechanism configured to detach the cross member from the side members, in accordance with a load toward a rear side of the vehicle input to the cross member. The load triggering the detachment by the cross member detachment mechanism decreases as the cross member rises with respect to the side members.

With this configuration, for the occupant with a small body size, the cross member receives a rearward load input from the back part of the upper body of the occupant when the rear collision occurs, so that the upper body of the occupant can be prevented from being excessively sinking into the backrest.

Thus, the forward bending of the neck due to the back of the head of the occupant pushed by the headrest can be reduced.

On the other hand, for the occupant with a large body size, the cross member is raised together with the headrest. Thus, a load triggering the detachment by the cross member detachment mechanism is reduced, whereby the detachment of the cross member is facilitated.

When the rear collision occurs, the cross member is detached. Thus, the upper body of the occupant appropriately sinks into the backrest and the headrest supports the head, whereby the whiplash injury due to backward bending of the neck can be reduced.

According to the disclosure, a configuration may be employed in which the cross member detachment mechanism comprises: grooves that are formed in the side members, extend in the upward-downward direction, and have a groove bottom side wider than a surface side of the side members; and engagement parts that are provided in the cross member and engage with the grooves, and on the surface side of the side members, a width of the grooves is larger on an upward side than a downward side of the side members.

Accordingly, the above-described effects can be obtained with a simple configuration.

According to the disclosure, a configuration may be employed in which deformation reduction members are further provided that are formed in a tubular shape into which the side members are inserted, move upward and downward with respect to the side members together with the cross member, and reduce deformation of the side members in a direction of widening the grooves.

With this configuration, the deformation of the side members in the direction of widening the grooves is reduced in the portions where the deformation reduction members are provided, whereby the load triggering the detachment of the cross member can be appropriately set.

When this configuration is employed, the deformation reduction members may be respectively provided above and below the cross member.

Thus, the above-described effects can be even further promoted.

As described above, according to the disclosure, it is possible to provide a seat that reduces injury of an occupant due to rear collision.

The invention claimed is:

1. A seat on which an occupant of a vehicle is seated, the seat comprising:
   a backrest that faces a back part of the occupant;
   a headrest provided in an upper part of the backrest;
   a backrest frame comprising side members that extend in an upward-downward direction along a left side end part and a right side end part of the backrest respectively;
   a cross member that is provided to bridge the side members and attached to the side members to be movable upward and downward;
   a headrest post that protrudes downward from the headrest and is coupled to the cross member; and
   a cross member detachment mechanism configured to perform detachment of the cross member from the side members, in accordance with a load toward a rear side of the vehicle input to the cross member, wherein
   the load triggering the detachment by the cross member detachment mechanism decreases as the cross member rises with respect to the side members.

2. The seat according to claim 1, wherein
   the cross member detachment mechanism comprises:
      grooves that are provided in the side members respectively and extend in the upward-downward direction, the grooves each including a groove bottom side wider than a surface side of a corresponding side member of the side members; and engagement parts that are provided in the cross member and engage with the grooves respectively, and on the surface side, the grooves each have a larger width of larger on an upward side of the corresponding side member than a downward side of the corresponding side member.

3. The seat according to claim 2, the seat further comprising deformation reduction members that each have a tubular shape into which the side members are inserted respectively, the deformation reduction members being configured to move upward and downward with respect to the side members together with the cross member to reduce deformation of the side members in a direction of widening the grooves.

4. The seat according to claim 3, wherein the deformation reduction members are provided respectively above and below the cross member.

* * * * *